(12) United States Patent
Westre et al.

(10) Patent No.: US 8,240,606 B2
(45) Date of Patent: *Aug. 14, 2012

(54) INTEGRATED AIRCRAFT FLOOR WITH LONGITUDINAL BEAMS

(75) Inventors: Willard N. Westre, Bellevue, WA (US); Kevin M. Retz, Bothell, WA (US)

(73) Assignee: The Boeing Company, Chicago, IL (US)

( * ) Notice: Subject to any disclaimer, the term of this patent is extended or adjusted under 35 U.S.C. 154(b) by 750 days.

This patent is subject to a terminal disclaimer.

(21) Appl. No.: 12/411,615

(22) Filed: Mar. 26, 2009

(65) Prior Publication Data

US 2010/0243803 A1    Sep. 30, 2010

(51) Int. Cl.
*B64C 1/18* (2006.01)
(52) U.S. Cl. .......................................... 244/119; 244/133
(58) Field of Classification Search ............... 244/118.5, 244/119, 118.1, 123.13, 133
See application file for complete search history.

(56) References Cited

U.S. PATENT DOCUMENTS

| | | | | |
|---|---|---|---|---|
| 4,081,940 | A | * | 4/1978 | Hughes ........................... 52/712 |
| 4,479,621 | A | * | 10/1984 | Bergholz .................. 244/117 R |
| 4,648,570 | A | * | 3/1987 | Abdelmaseh et al. ..... 244/118.1 |
| 5,543,199 | A | | 8/1996 | Fell |
| 7,182,291 | B2 | * | 2/2007 | Westre et al. ................. 244/119 |
| 7,770,844 | B2 | * | 8/2010 | Chrissos et al. ........... 244/118.1 |
| 7,775,477 | B2 | * | 8/2010 | Wood ......................... 244/118.1 |
| 7,861,970 | B2 | * | 1/2011 | Griess et al. .................. 244/120 |
| 2007/0176048 | A1 | * | 8/2007 | Huber et al. .................. 244/119 |
| 2007/0194175 | A1 | | 8/2007 | Kismarton et al. |
| 2008/0078129 | A1 | * | 4/2008 | Wood et al. ................... 52/127.1 |
| 2008/0210820 | A1 | * | 9/2008 | Kismarton et al. ........... 244/120 |
| 2009/0206202 | A1 | * | 8/2009 | Bolukbasi et al. ............ 244/121 |
| 2009/0236472 | A1 | * | 9/2009 | Wood .......................... 244/119 |
| 2009/0294587 | A1 | * | 12/2009 | Ricaud et al. ................. 244/119 |

FOREIGN PATENT DOCUMENTS

WO  PCT/US2010/024492    2/2010

\* cited by examiner

*Primary Examiner* — Robert Canfield
*Assistant Examiner* — Jody Giacoman
(74) *Attorney, Agent, or Firm* — Parsons Behle & Latimer

(57) ABSTRACT

An integrated floor for an aircraft fuselage includes a composite panel forming a floor surface and composite beams bonded to the floor panel. The beams extend longitudinally within the fuselage and support the floor.

23 Claims, 5 Drawing Sheets

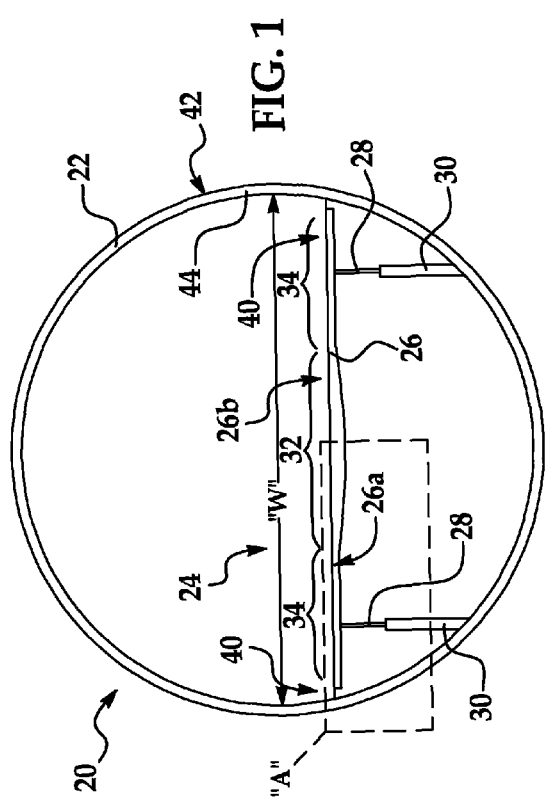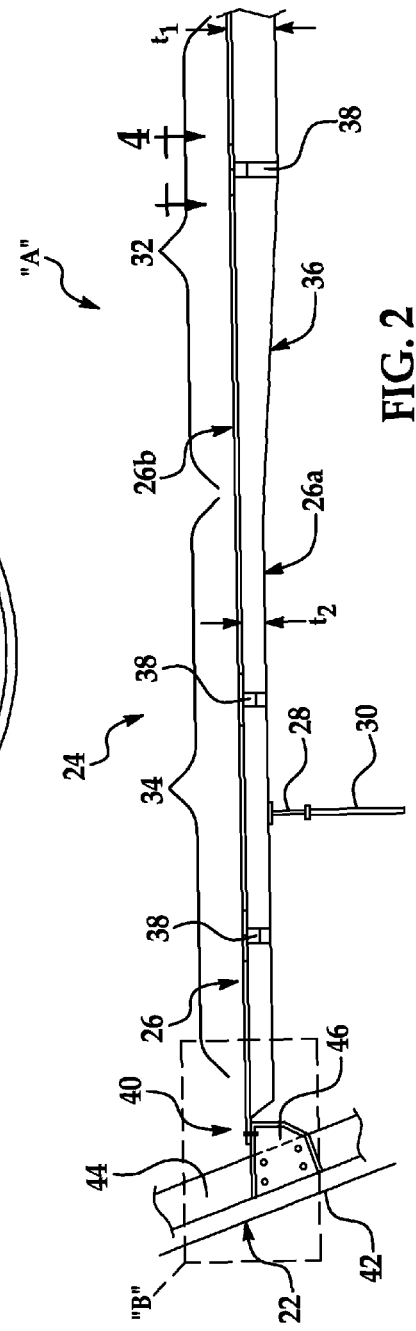

INTEGRATED AIRCRAFT FLOOR WITH LONGITUDINAL BEAMS

CROSS REFERENCE TO RELATED APPLICATIONS

This application is related to co-pending U.S. patent application Ser. Nos. 11/358,503 filed Feb. 21, 2006 and 12/056,456 filed Mar. 27, 2008, both of which applications are incorporated by reference herein in their entireties.

TECHNICAL FIELD

This disclosure generally relates to floors used in aircraft to support passenger or cargo loads, and deals more particularly with a composite floor having integrated longitudinal stiffening beams.

BACKGROUND

Floors used in larger commercial and military aircraft cargo bays and passenger cabins typically comprise multiple components that may be joined together using discrete fasteners. These components may include multiple floor panels sections that must be joined together at seams to form the floor, as well as seat tracks, floor beams, equipment and other reinforcing members, all of which may be fastened together to form a relatively large assembly.

Floors of the type described above may be expensive to fabricate because of the labor required to assemble multiple components, and may be relatively heavy because of the materials that are used, and the relatively large number of required fasteners. The production processes and labor required to assemble the large number of components with the required tolerances may be time consuming, and therefore may not be best suited to high volume production.

Accordingly, there is a need for a structural light-weight floor for aircraft that is well suited to high production flow. There is also a need for a floor having integrated components that reduce or obviate the need for fasteners and which exhibits improved impact resistance, lower acoustic transmission and reduced overall thickness.

SUMMARY

The disclosed embodiments provide a light-weight, integrated composite floor for aircraft formed from components that may be assembled substantially without the need for fasteners. The integrated floor may be assembled using composite components that are bonded together. The integrated floor may be fabricated outside of an aircraft fuselage in order to improve production flow times. Due to the use of composite materials in the floor, the floor exhibits improved impact resistance, lower acoustic transmission and a lower profile (overall thickness), and may be assembled using fewer parts.

According to one disclosed embodiment, an integrated floor for an aircraft fuselage comprises a composite panel including a floor surface. Composite beams are bonded to the panel and extend longitudinally within the fuselage to support the floor. The floor panel includes a sandwiched core extending substantially the entire width of the fuselage, and includes integrated mounting tracks. The longitudinal beams are spaced inboard of the lateral edges of the panel. The lateral edges of the panel are adapted to be supported on frames forming part of the fuselage.

According to another embodiment, an aircraft fuselage has an integrated composite floor. The fuselage includes frame members and a composite floor panel spanning substantially the entire width of the fuselage. The lateral edges of the panel are supported on the frame members. The floor panel includes a composite sandwich having a core with a thickness in medial regions that is greater than in outboard lateral regions. A pair of laterally spaced apart, longitudinally extending beams are bonded to the floor. Stanchions support the beams on the frame members. The floor panel may include a composite sandwich including a honeycomb core wherein the density of the core at the outer edges of the floor panel is different from the density of the core in medial regions of the floor panel.

According to another embodiment, an integrated floor is provided for an aircraft. The floor includes a composite floor panel and composite flanges along the lateral edges of the floor panel. The flanges support the lateral edges of the panel on frame members.

The disclosed embodiments satisfy the need for a floor for an aircraft fuselage having integrated components including a floor panel, mounting tracks and floor beams.

BRIEF DESCRIPTION OF THE ILLUSTRATIONS

FIG. 1 is an illustration of a cross section of an aircraft fuselage having an integrated floor according to the disclosed embodiments.

FIG. 2 is an illustration of the area designated as "A" in FIG. 1.

DETAILED DESCRIPTION

Figure 3:
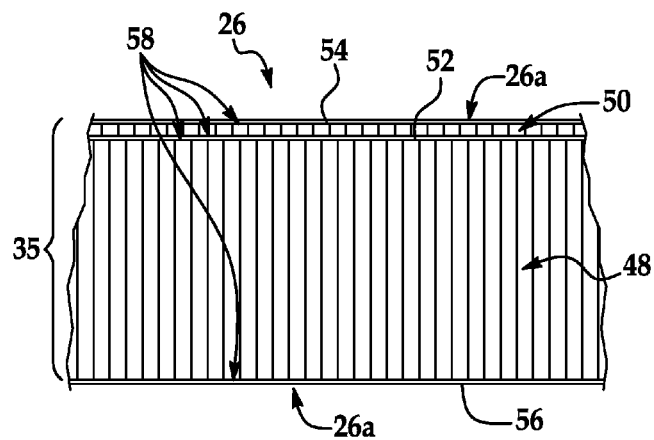
FIG. 3 is an illustration of a cross section of the floor panel forming part of the integrated floor shown in FIG. 1.

Referring first to FIGS. 1 and 2 an aircraft 20 has an integrated floor 24 supported within a fuselage 22 which, in the illustrated example, is generally circular in cross section. The integrated floor 24 may be employed with a fuselage having other cross sectional shapes, such as, without limitation, oval, elliptical and generally square shapes. The fuselage 22 includes a plurality of longitudinally spaced, generally circular frame members 44 which extend around the fuselage 22 in a hoopwise direction and are covered by an outer skin 42. The integrated floor 24 includes a unitary floor panel 26 which spans substantially the entire width "W" of fuselage 22, and a pair of integrated floor beams 28.

The integrated floor 24 is preferably as long as the fuselage 22 or fuselage section (not shown) in which it is installed. The floor beams 28 extend longitudinally within the fuselage 22 and may be bonded or otherwise coupled to the bottom surface 26a of the floor panel 26. The floor beams 28 may be spaced inboard of the outer extremities 40 of the floor panel 26, and are respectively supported by stanchions 30 mounted on the frame members 44. The floor beams 28 may serve to both support the floor panel 26 and to distribute the floor load over the stanchions 30. The floor beams may also serve to stiffen the floor panel 26. The integrated floor 24 may further include integral mounting attachment tracks 38 (FIG. 2) which will be discussed later in more detail. The floor panel 26 includes a medial region 32 having a thickness $t_1$ which tapers at 36 to a reduced thickness $t_2$ in lateral regions 34 of the panel 26. The outer extremities 40 of the floor panel 26 are supported on composite brackets 46 which are respectively secured to frame members 44.

Beams 28 provide support for the floor panel 26 in the spanwise or cross fuselage direction, and reduce the length of the span in which the floor panel 26 must be self-supporting. While only 2 longitudinal beams 28 are shown in the illustrated embodiments, more than two of the beams 28 may be desirable or necessary depending upon the application. The floor panel 26 may be self-supporting at least across the substantially the entire span between the floor beams 28. The increased thickness $t_1$ of the floor panel 26 in the medial region 32 provides the floor panel 26 with the necessary stiffness required to resist transverse bending moments between the beams 28. As previously mentioned, the longitudinal beams 28 also provide the floor 24 with stiffness in the longitudinal direction of the fuselage 22.

Attention is now directed to FIG. 3 which illustrates additional details of the floor panel 26. The floor panel 26 comprises a structural core 35 sandwiched between and bonded to top and bottom skins 54, 56 respectively, sometimes also referred to as facesheets. The top skin 54 forms a floor surface 26a, while the bottom skin 56 forms a substantially flat bottom surface 26a to which the floor beams 28 may be bonded. The construction details of the floor panel 26 may be generally similar to those disclosed in U.S. patent application Ser. Nos. 12/056,456, filed Mar. 27, 2008 and 11/358,503 filed Feb. 21, 2006, and U.S. Pat. No. 7,182,291 issued Feb. 27, 2007, the entire disclosures of which are incorporated by reference herein.

The structural core 35 includes a first structural honeycomb core 48, and a second structural honeycomb core 50. The first structural honeycomb core 48 is sandwiched between and bonded to the bottom skin 56 and a septum 52. The second structural honeycomb core 50 is sandwiched between and bonded to the septum 52 and the top skin 54. The first structural honeycomb core 48 may be formed of a suitable honeycomb material or other structural material having a density lower than that of the second structural honeycomb core 50. The skins 54, 56 and septum 52 each may be a composite of thermoplastic resins, such as, without limitation, PEKK, PEEK, PPS, PEI or PBO, or thermoset resins such as, without limitation, epoxy, vinyl, ester, bismaleimide, cynate ester or polyimide. The resin may include reinforcing fibers such as, without limitation, carbon, carbon/glass hybrid, glass, Vectran®, Zylon®, quartz, Dyneema®, Spectra® or other hybrids of fibers. The adhesives may be epoxy, bismaleimide, polyimide or other aircraft grade adhesive materials. The top skin 54 and/or the bottom skin 56 may include stitch reinforcing (not shown). In one embodiment, for example and without limitation, the top skin 54 may have a thickness in the range of approximately 0.03 inches to 0.08 inches, while the bottom skin 56 may have a thickness in the range of approximately 0.02 to 0.08 inches. The skins 54, 56 may be formed from one or more plies of prepreg or subsequently impregnated dry fabric according to a ply schedule which may specify the number and layup orientation of the plies and the type of ply material.

For convenience of description, the first structural honeycomb core 48 may be referred to hereinafter as a low density core, while the second structural honeycomb core 50 may be referred to as a high density core. The low density core 48 may comprise, for example and without limitation, a honeycomb structured material, NOMEX® or Kevlar® having a thickness that will depend upon the load requirements of the particular application. In one embodiment, for example and without limitation, the low density core 48 may have a density of approximately 2 pounds/cubic foot to 3 pounds/cubic foot, and the high density core 50 may comprise a honeycomb structured material, Kevlar® or a metal having a thickness less than the low density core 48. In one exemplary embodiment, for example and without limitation, the high density core 50 may have a density in a range of approximately 3 pounds/cubic foot to 20 pounds/cubic foot. The terms "low density core" and "high density core" may be viewed relative to one another as opposed to being defined within predefined density ranges. Either of the cores 48, 50 may be formed of a variety of other composites and/or metals such as aluminum and titanium, and may include structural reinforcements other than a honeycomb.

The septum 52 may comprise multiple plies of material including a structural layer, such as a CFRP layer, sandwiched between two adhesive materials 58. In other embodiments, the structural layer of the septum 52 may vary to include any number of materials such as, without limitation, titanium or other metals, CFRP, a titanium-CFRP laminate, a titanium foil sheet, a titanium-CFRP laminate, a fiberglass laminate, a CFRP reinforced sheet, a thermoplastic sheet, a thermoplastic resin, and/or a variety of other laminates.

The floor panel 26 described above may have a structural strength which is sufficient to allow it to be fabricated and bonded to the floor beams 28 while outside of the aircraft 20, and then handled and transported as a single stand-alone integrated floor 24 to the aircraft 20 where it may be installed within the fuselage 22. Additionally, the floor panel 26 may have sufficient structural strength to support one or more system components (not shown) such as, without limitation, ducts, conduits, wiring, plumbing and the like, which may be attached to the integrated floor 24 before the floor 24 is installed in the aircraft 20. The high density core 50 provides the floor surface 26a with relatively high impact resistance, while the low density core 48 provides the floor panel 26 with structural stiffness sufficient to resist bending moments in the transverse direction of the fuselage 22.

Figure 4:
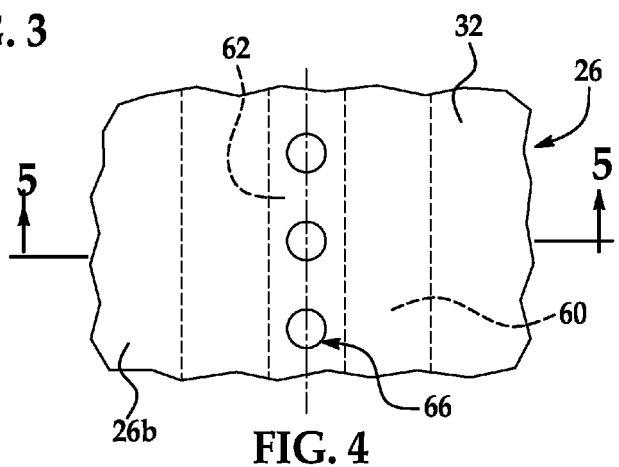
FIG. 4 is an illustration of a plan view of a portion of the integrated floor shown in FIGS. 1 and 2, in the area designated as 4-4 in FIG. 2.
Figure 5:
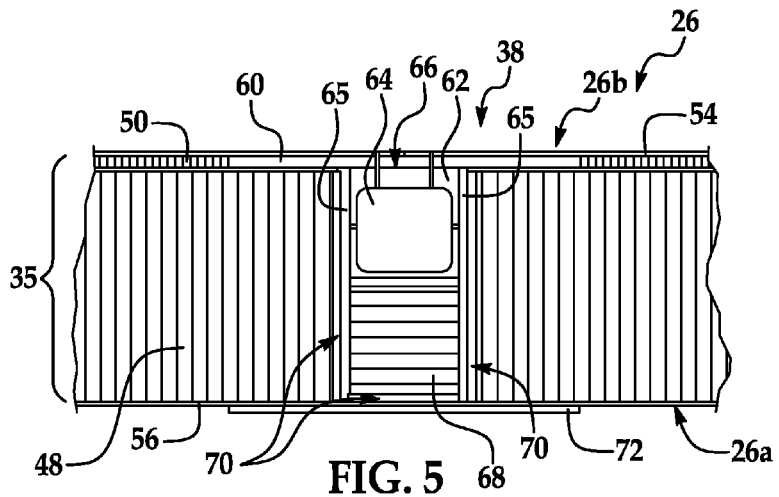
FIG. 5 is an illustration of a sectional view taken along the line 5-5 in FIG. 4.

Referring now to FIGS. 4 and 5, as previously mentioned, the integrated floor 24 may include any number of mounting tracks 38 that are integrated within the floor panel 26. Each of the mounting tracks 38 includes a substantially hollow tube 62 of generally rectangular cross section which is disposed within the low density core 48 and runs longitudinally through the floor panel 26, adjacent the floor surface 26b. The tube 62 may be formed from any number of materials such as without limitation, a metal such as, without limitation, titanium. The tube 62 may include a plurality of longitudinally spaced holes 66 which pass through a strap 60 recessed within the high density core 50. The strap 60 may comprise, for example and without limitation, a carbon fiber epoxy composite which overlies the tube 62 and protects the floor surface 26 along the mounting track 38.

The hollow interior 64 of the tube 62 is adapted to receive retainers (not shown) which may be coupled with fasteners (not shown) passing through the holes 66 in order to fasten a component, such as, without limitation, a seat, a galley or flight equipment (not shown) onto the floor panel 26. A transversely extending honeycomb core 68 is positioned between the tube 68 and the bottom skin 56. The tube 62 and the core 68 may be sandwiched between and bonded to two strips of composite web 65 which extend longitudinally along the length of the mounting track 38, substantially perpendicular to the floor surface 26b. The core 68 and the tube 62 may be bonded to the low density core 48 and the bottom skin 56 by layers of adhesive foam 70. A composite doubler 72 may be applied to the lower skin 56 in the area of the mounting track 38 in order to stiffen the panel 26 in the area of the mounting track 38.

Figure 6:
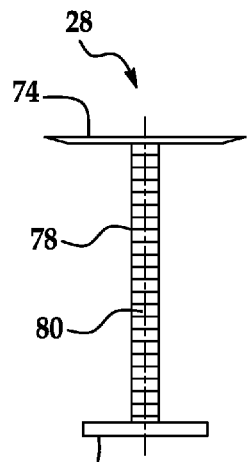
FIG. 6 is an illustration of a cross sectional view of one of the beams forming part of the integrated floor shown in FIG. 1.
Figure 7:
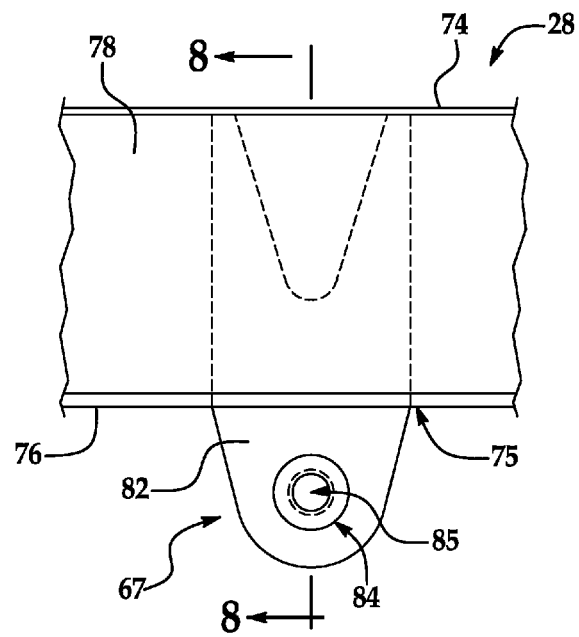
FIG. 7 is an illustration of a side view of the beam shown in FIG. 6, including an imbedded attachment lug.
Figure 8:
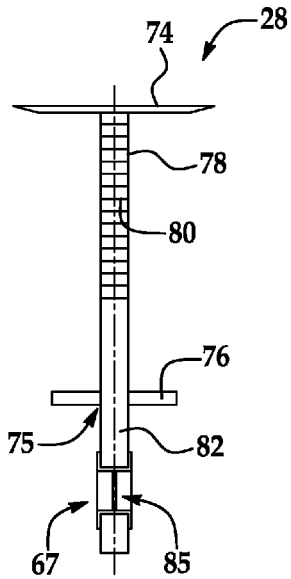
FIG. 8 is an illustration of a sectional view taken along the line 8-8 in FIG. 7.

Attention is directed to FIGS. 6, 7 and 8, which illustrate additional details of the floor beams 28. The floor beams 28 comprise upper and lower composite caps 74, 76 respectively, connected by and bonded to a web 78 having a honeycomb or other suitable structural core 80. A web 78 may be formed of a composite or a metal such as titanium. The cap 74 extends substantially parallel and is bonded to the bottom surface 26a of the floor panel 26. Each of the beams 28 may include a plurality of integrally formed mounting lugs 82 which may comprise, for example and without limitation, a composite laminate. The lugs 82 may be spaced along the length of the beam 28, respectively in alignment with the spacing of the underlying stanchions 30 (FIGS. 1 and 2). Each of the lugs 82 displaces a portion of the core 80 and extends downwardly through a slit 75 in the bottom flange 76. The exposed portion 67 of the lug 82 includes an opening 85 having a bushing 84 adapted to receive a pin (not shown) for connecting the lug 82 with a corresponding stanchion 30 (FIGS. 1 and 2) in order to support the integrated floor 24 on the frame members 44 (FIG. 2) of the fuselage 22.

Figure 9:
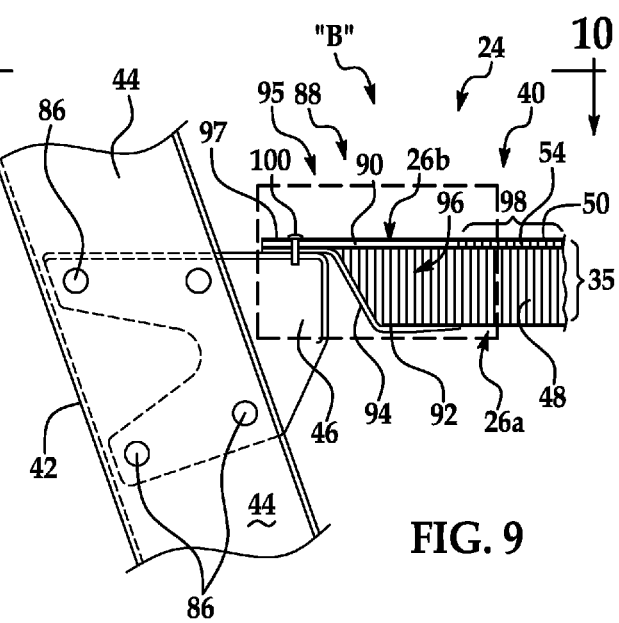
FIG. 9 is an illustration of the area designated as "B" in FIG. 2 showing a floor-to-frame attachment.
Figure 9A:
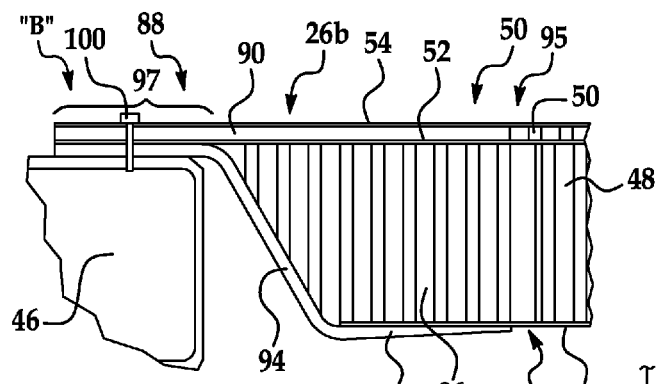
FIG. 9A is an illustration of a sectional view in the area designed as "B" in FIG. 9.
Figure 10:
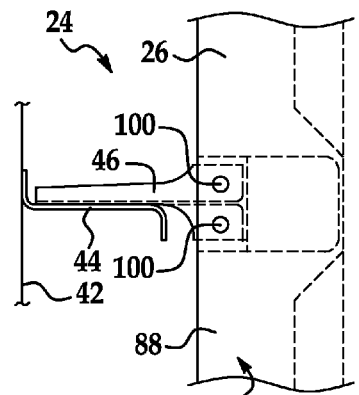
FIG. 10 is an illustration of a plan view of the area shown in FIG. 9, indicated by the viewing line 10-10.

Reference is now made to FIGS. 9, 9A and 10 which illustrate additional details of the connection between the outer extremities 40 of the integrated floor 24 and the frame members 44. The outer extremities 40 are mounted on and connected to brackets 46 by means of flanges 88 which form an integral part of the lateral edges 95 of the floor panel 26. The flanges 88 may be respectively secured to frame members 44 by fasteners 100 that may comprise, for example and without limitation, an interference fit fastener such as a lockbolt commonly used in the aircraft industry. In the illustrated example, the brackets 46 may be formed of composite materials, however other materials including metal may be used. The flanges 88 include upper and lower straps 90, 92 respectively, which may be formed of composite materials. The low density core 48 of the floor panel 26 transitions into a core 96 having substantially the same thickness as that of the low density core 48 but having a density that may be between that of the low density core 48 and the high density core 50. Thus, the core 96, which may be formed from a honeycomb or other structure, may be regarded as being as medium density core, relative to the low and high density cores 48, 50 respectively.

The upper strap 90 extends substantially coplanar with the high density core 50, sandwiched between and bonded to the top skin 54 and the septum 52, so as to form a substantially smooth extension of the upper floor surface 26b. The lower strap 92 acts as a closeout overlying the bottom skin 56 which extends laterally beyond the low density core 48 so as to overlap the medium density core 96. The lower strap 92 includes a transition area 94 ramps the flange 88 to a flange extension 97 where the straps 90, 92 are bonded face-to-face. The flange extension 97 rests on top of the bracket 46 and may be secured thereto with the previously mentioned fasteners 100. The flange 88 formed by the straps 90, 92 and the medium density core 96, strengthen the outer extremities 40 of the panel 26 where they are supported on the brackets 46.

Figure 11:
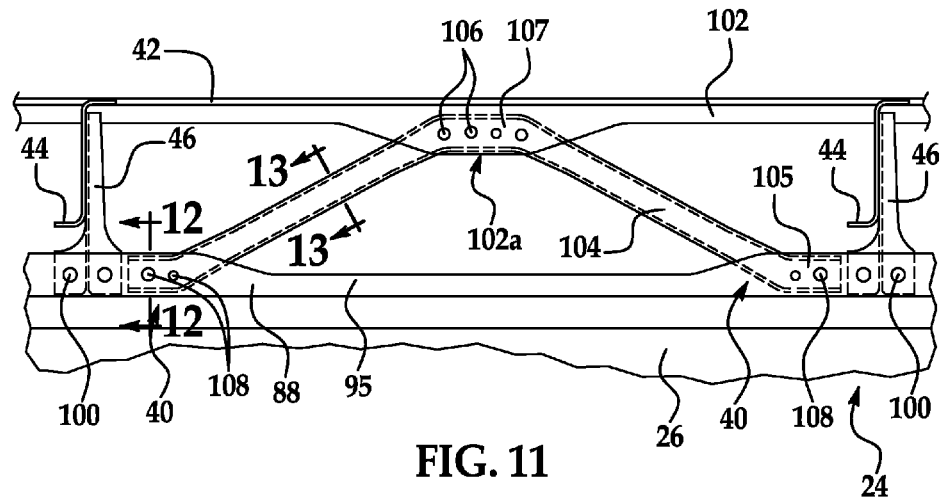
FIG. 11 is an illustration of a plan view similar to FIG. 10 but showing a longer length of the floor panel in an area where a truss is connected between the floor panel and the fuselage.
Figure 12:
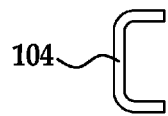
FIG. 12 is an illustration of a sectional view taken along the line 12-12 in FIG. 11.
Figure 13:
FIG. 13 is an illustration of a sectional view taken along the line 13-13 in FIG. 11.

Referring to FIGS. 11, 12 and 13, the integrated floor 24 may be connected to the fuselage 22 to carry longitudinal loads by means of trusses 104 which extend longitudinally along the lateral edges 95 of the floor panel 26 and are disposed between the floor panel 26 and longitudinally extending stringers 102 forming part of the fuselage 22. The trusses may be formed from any suitable material, such as, without limitation, a thermoplastic composite material or a metal. The ends 105 of the trusses 104 may be secured by fasteners 108 to the outer extremities 40 in the panel 26. A medial portion 107 of the trusses 104 is secured by fasteners 106 to a section 102a of the stringers 102. The trusses 104 transfer longitudinal (fore and aft) loads between the floor 26 and the stringers 102. In the illustrated embodiment, the cross section of the trusses 104 may transition from a U-shape cross section shown in FIG. 13 to a substantially C-shaped cross section as shown in FIG. 12 at the ends 105 of the trusses 104.

Figure 14:
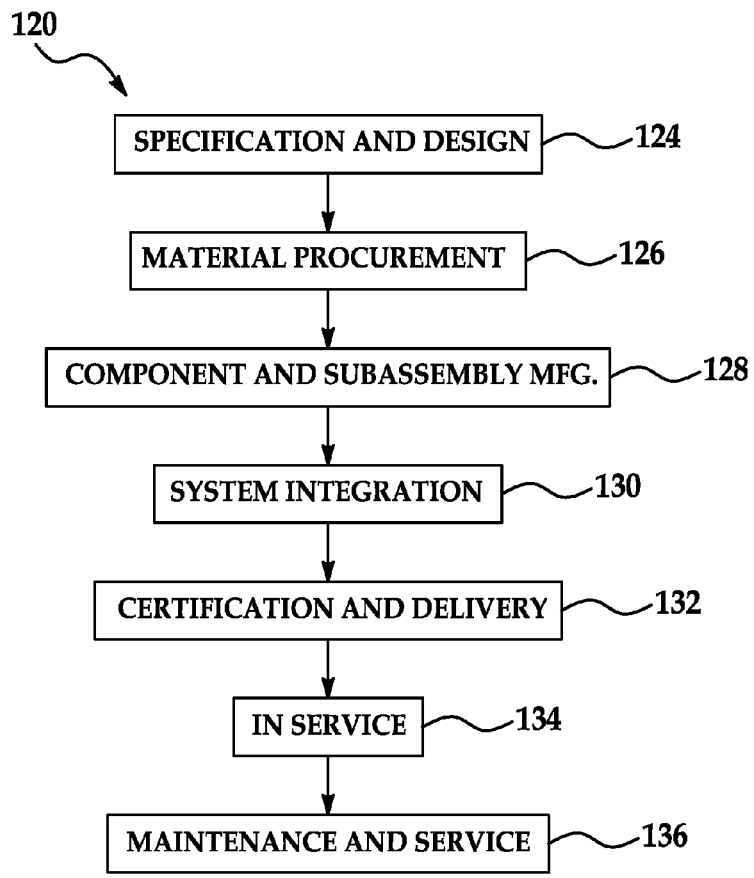
FIG. 14 is an illustration of a flow diagram of aircraft production and service methodology.
Figure 15:
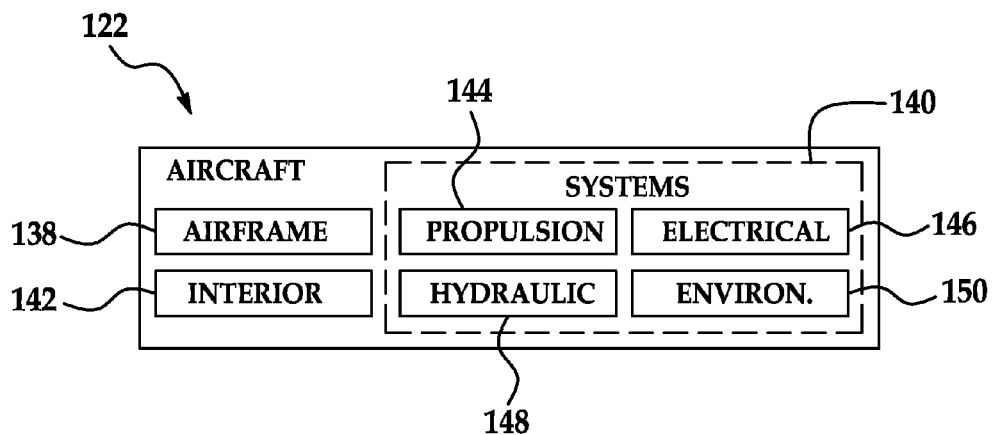
FIG. 15 is an illustration of a block diagram of an aircraft.

Embodiments of the disclosure may find use in a variety of potential applications, particularly in the transportation industry, including for example, aerospace, marine and automotive applications. Thus, referring now to FIGS. 14 and 15, embodiments of the disclosure may be used in the context of an aircraft manufacturing and service method 120 as shown in FIG. 14 and an aircraft 122 as shown in FIG. 15. During pre-production, exemplary method 120 may include specification and design 124 of the aircraft 122 and material procurement 126 in which the disclosed integrated floor 24 may be specified for use. During production, component and subassembly manufacturing 128 and system integration 130 of the aircraft 122 takes place. The disclosed integrated floor 24 may be fabricated as an integrated assembly outside the aircraft 122 and then moved as a single assembled unit into the aircraft 122 where it is installed. Additional components such as seats (not shown) may be mounted on the integrated floor 24 during system integration 130. Thereafter, the aircraft 122 may go through certification and delivery 132 in order to be placed in service 134. While in service by a customer, the aircraft 122 is scheduled for routine maintenance and service 136 (which may also include modification, reconfiguration, refurbishment, and so on). Components may be removed and/or installed on the integrated floor 24 during the maintenance and service 136.

Each of the processes of method 120 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 122 produced by exemplary method 120 may include an airframe 138 with a plurality of systems 140 and an interior 142. Examples of high-level systems 140 include one or more of a propulsion system 144, an electrical system 146, a hydraulic system 148, and an environmental system 150. Any number of other systems may be included. Although an aerospace example is shown, the principles of the disclosure may be applied to other industries, such as the marine and automotive industries.

Systems and methods embodied herein may be employed during any one or more of the stages of the production and service method 120. For example, components or subassemblies corresponding to production process 128 may be fabricated or manufactured in a manner similar to components or subassemblies produced while the aircraft 122 is in service. Also, one or more apparatus embodiments, method embodiments, or a combination thereof may be utilized during the production stages 128 and 130, for example, by substantially expediting assembly of or reducing the cost of an aircraft 122. Similarly, one or more of apparatus embodiments, method embodiments, or a combination thereof may be utilized while the aircraft 122 is in service, for example and without limitation, to maintenance and service 136.

Although the embodiments of this disclosure have been described with respect to certain exemplary embodiments, it is to be understood that the specific embodiments are for purposes of illustration and not limitation, as other variations will occur to those of skill in the art.

What is claimed:

1. An integrated floor for an aircraft fuselage, comprising:
    a composite floor panel including a floor surface and a honeycomb core wherein the core at outer lateral edges of the panel having a density different than that in a medial region of the panel; and
    beams attached to the floor panel, the beams extending longitudinally within the fuselage and supporting the floor.

2. The integrated floor of claim 1, wherein:
    the floor panel includes a sandwiched core extending substantially across the entire width of the fuselage, and
    the beams are bonded to the bottom of the floor panel opposite the floor surface.

3. The integrated floor of claim 1, further comprising:
    at least one mounting track integrated into the floor panel and adapted to mount a component on the floor panel.

4. The integrated floor of claim 1, wherein:
    the beams include at least two composite beams transversely spaced from each other and respectively spaced inboard of opposite lateral edges of the floor panel.

5. The integrated floor of claim 4, wherein each of the beams includes integrated lugs adapted to be coupled with a stanchion for supporting the beam on the fuselage.

6. The integrated floor of claim 1, wherein:
    the beams are spaced inboard of opposite lateral edges of the floor panel, and
    the opposite lateral edges of the floor panel are adapted to be supported on a frame of the fuselage.

7. The integrated floor of claim 1, wherein the floor panel includes:
    a medial region and lateral regions on opposite sides of the medial region, and
    a tapering thickness from the medial region to each of the lateral regions.

8. The integrated floor of claim 1, wherein:
    the beams include a pair of beams transversely spaced apart from each other, and
    the floor panel includes a medial region between the pair of beams and lateral regions respectively outboard of the beams,
    the panel having a thickness greater in the medial region than in the lateral regions.

9. An aircraft fuselage having an integrated composite floor, comprising:
    frame members extending around the hoopwise direction of the fuselage; and
    a composite floor panel spanning substantially the entire width of the fuselage and having lateral outer edges supported on the frame members; said floor panel further comprises a composite sandwich including a honeycomb core, wherein the density of the core at outer lateral edges of the floor panel is different than the density of the core in medial regions of the floor panel.

10. The aircraft fuselage of claim 9, wherein:
    the floor panel includes a composite sandwich having a core, and
    the core has a thickness in medial regions of the floor panel greater than in lateral regions of the floor panel.

11. The aircraft fuselage of claim 10, further comprising:
    a pair of laterally spaced apart beams extending longitudinally through the fuselage and bonded to the floor panel; and
    a pair of stanchions respectively supporting the beams on the frame members.

12. The aircraft fuselage of claim 9, further comprising brackets for mounting the floor panel on the frame members, and wherein the floor panel includes:
    a composite sandwich including a core, and
    a composite flange integrated into the sandwich at each of the lateral edges of the floor panel for mounting the floor panel on the brackets.

13. The aircraft fuselage of claim 12, wherein:
    the brackets are secured to the frame members, and
    each of the composite flanges includes first and second straps respectively bonded to opposite sides of the core, the straps having extremities bonded together to form a flange extension mounting the floor panel on one of the brackets.

14. The aircraft fuselage of claim 12, wherein:
    the composite core includes first and second honeycomb layers respectively having a high density and a low density, and
    each of the flanges includes a honeycomb core having a medium density.

15. The aircraft fuselage of claim 9, wherein the floor panel includes integrated mounting tracks.

16. An integrated floor for an aircraft, comprising:
    a composite floor panel having opposite lateral edges; said floor panel includes a core having opposite faces sandwiched between top and bottom skins; and
    composite flanges integrated into the lateral edges of the panel and respectively adapted for mounting the floor panel on supports; each of the composite flanges includes first and second composite straps bonded to the opposite faces of the core.

17. The integrated floor of claim 16, wherein the straps include extremities bonded together to form a flange extension for connecting the panel to the supports.

18. The integrated floor of claim 16, wherein:
    the floor panel includes a sandwich having first and second cores respectively having first and second differing densities, and
    each of the flanges includes a pair of composite straps and a third core sandwiched between straps, wherein the third core has a third density between the first and second densities.

19. The integrated floor of claim 18, wherein the third core is bonded to the first core.

20. The integrated floor of claim 16, further comprising a plurality of trusses connected to opposite lateral edges of the floor panel.

21. The integrated floor of claim 16, wherein the floor panel is of substantially unitary construction.

22. The integrated floor of claim 16, further comprising at least one mounting track integrated into the floor panel and adapted to mount a component on the floor panel.

23. An aircraft fuselage having an integrated composite floor, comprising:
- a substantially unitary composite floor panel extending substantially across the entire fuselage, the floor panel including a composite sandwich having a dual density core;
- a plurality of frame members extending circumferentially around and longitudinally spaced along the fuselage;
- a pair of transversely spaced apart composite beams supported on the frame members and bonded to the floor panel;
- at least one mounting track integrated into the floor panel and adapted for mounting a component on the floor panel;
- brackets respectively mounted on the frame members for supporting lateral edges of the floor panel on the frame members; and,
- composite flanges integrated into the floor panel for attaching the lateral edges of the floor panel to the brackets, each of the flanges including a pair of composite straps bonded together to form a flange extension attached to one of the brackets, and a core sandwiched between the straps, the core between the straps having a density different than the densities of the dual cores of the floor panel.

* * * * *